US012309541B2

(12) United States Patent
Davis et al.

(10) Patent No.: US 12,309,541 B2
(45) Date of Patent: May 20, 2025

(54) AUTOMATICALLY DETECTING AN EARPIECE MODE BASED ON WHETHER A DUCT IS SEALED OR UNSEALED

(71) Applicant: Motorola Mobility LLC, Chicago, IL (US)

(72) Inventors: Giles Tucker Davis, Downers Grove, IL (US); Robert Murdock, Naperville, IL (US); Joseph Charles Dwyer, Downers Grove, IL (US)

(73) Assignee: Motorola Mobility LLC, Chicago, IL (US)

( * ) Notice: Subject to any disclaimer, the term of this patent is extended or adjusted under 35 U.S.C. 154(b) by 175 days.

(21) Appl. No.: 18/110,243

(22) Filed: Feb. 15, 2023

(65) Prior Publication Data

US 2024/0276135 A1 Aug. 15, 2024

(51) Int. Cl.
*H04R 1/00* (2006.01)
*H04R 1/10* (2006.01)
*G10K 11/16* (2006.01)

(52) U.S. Cl.
CPC ......... *H04R 1/1041* (2013.01); *H04R 1/1083* (2013.01); *H04R 2460/01* (2013.01); *H04R 2460/11* (2013.01)

(58) Field of Classification Search
CPC .............. H04R 1/1041; H04R 2460/01; H04R 2460/11; H04R 1/1083
USPC .................................................. 381/74, 71.6
See application file for complete search history.

(56) References Cited

U.S. PATENT DOCUMENTS

| | | | | |
|---|---|---|---|---|
| 9,208,769 | B2 | 12/2015 | Azmi | |
| 11,044,546 | B1 | 6/2021 | Graham | |
| 2016/0330537 | A1 | 11/2016 | Barrentine | |
| 2016/0330546 | A1 | 11/2016 | Barrentine et al. | |
| 2022/0400329 | A1* | 12/2022 | Kemmerer ........... | H04R 1/1016 |
| 2023/0403493 | A1* | 12/2023 | Machida .............. | H04R 1/1016 |

* cited by examiner

*Primary Examiner* — Ammar T Hamid
(74) *Attorney, Agent, or Firm* — FIG. 1 Patents

(57) ABSTRACT

An earpiece includes a portion that seals the earpiece in the user's ear, preventing or reducing sounds from an external environment (e.g., the outside world) from entering the user's ear canal and being heard by the user. The earpiece also includes a duct from the user's ear canal to the external environment, which may be open or closed. Whether the duct is open or closed is automatically determined, such as based at least in part on audio measurements at a microphone of the earpiece. When the duct is open, sounds can pass from the external environment to the user's ear canal, active noise cancellation (ANC) is disabled, and an appropriate equalization (EQ) setting is used. When the duct is closed, sounds from the external environment are prevented from passing through to the user's ear canal (or are reduced), ANC is enabled, and an appropriate EQ setting is used.

20 Claims, 13 Drawing Sheets

AUTOMATICALLY DETECTING AN EARPIECE MODE BASED ON WHETHER A DUCT IS SEALED OR UNSEALED

BACKGROUND

As technology has advanced our uses for computing devices have expanded. One such use is for the playback of audio content, such as music, soundtracks and dialog in movies, voices (e.g., for cellular phones), and so forth. Earpieces, also referred to earbuds, can be connected to a computing device in a wired or wireless manner, and are oftentimes used for the playback of audio content. However, these earpieces are not without their problems. One such problem is that some earpieces are closed (e.g., sealed to the user's ear canal), which may make the user's voice sound loud or unnatural, and some earpieces are open (e.g., not sealed to the user's ear canal), which tends to provide for poor audio quality (e.g., poor bass response). These problems can be frustrating for users, leading to user frustration with their devices and earpieces.

BRIEF DESCRIPTION OF THE DRAWINGS

Embodiments of automatically detecting an earpiece mode based on whether a duct is sealed or unsealed are described with reference to the following drawings. The same numbers are used throughout the drawings to reference like features and components.

DETAILED DESCRIPTION

Figure 1:
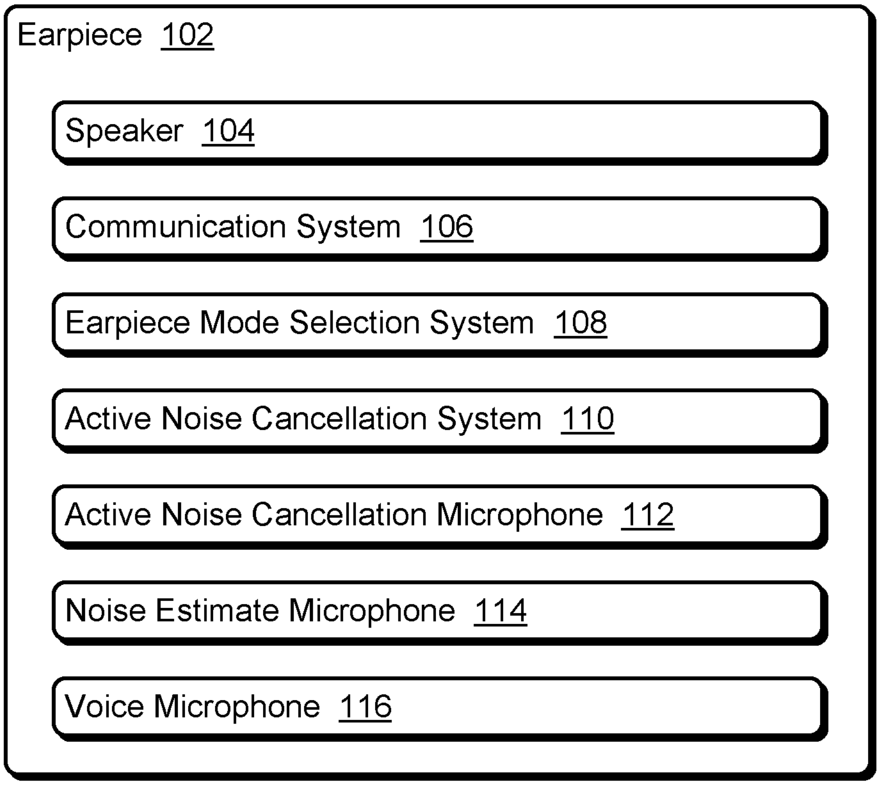
FIG. 1 illustrates an example earpiece implementing the techniques discussed herein.

Automatically detecting an earpiece mode based on whether a duct is sealed or unsealed is discussed herein.

Traditionally, earpieces are designed to be open or closed. A closed earpiece design seals to the user's ear canal and allows for good bass response, good isolation, and active noise cancellation (ANC). However, a closed earpiece performs poorly when the user is talking or chewing because such actions are very loud to the user and the user's speech typically does not sound natural to the user. An open earpiece design allows the user to plainly hear the environment. However, an open earpiece does not allow for good bass response due to front/back cancellation and the typically smaller piston area of a ring driver (e.g., transducer). An open earpiece also does not lend itself to ANC because an open back means no isolation so more cancelling energy is required and because poor bass response means less ability to provide cancelling energy.

In contrast, an earpiece as discussed herein includes a portion, which may be referred to as an ear tip, that seals the earpiece in the user's ear, preventing or reducing sounds from an external environment (e.g., the outside world) from entering the user's ear canal and being heard by the user. The earpiece also includes a duct from the user's ear canal to the external environment, and this duct may be open (also referred to as unsealed) or closed (also referred to as sealed). When the duct is open, sounds can pass from the external environment to the user's ear canal, allowing the user to hear the outside environment. Furthermore, ANC is disabled and an equalization (EQ) setting is used that takes into account the user's being able to hear the outside environment. When the duct is closed, sounds from the outside environment are prevented from passing through to the user's ear canal (or are reduced), reducing the sounds the user hears from the outside environment. Furthermore, ANC is enabled and an EQ setting is used that takes into account that the sounds from the outside world that the user hears are reduced or eliminated.

In one or more implementations, the earpiece includes one or more microphones that are used to determine whether the duct in the earpiece is open or closed. For example, a noise estimate microphone may be used to determine whether audio content being played back by the earpiece is leaking by greater than a threshold amount, and the duct is determined to be open in response to the audio content being leaked by greater than the threshold amount. By way of another example, an ANC microphone may be used to determine whether a difference in measured bass response and expected bass response is greater than a threshold amount, and the duct is determined to be open in response to the difference being greater than the threshold amount. By way of another example, a difference between the audio content measured at a noise estimate speaker and at an ANC microphone may be determined, and the duct is determined to be open in response to the difference being less than a threshold amount.

The techniques discussed herein improve the operation of an earpiece by supporting two different modes—an open or unsealed mode, and a closed or sealed mode. Accordingly, the user has an earpiece that provides the best of both worlds—operation in the open or unsealed mode allowing the user to plainly hear the environment, or operation in a closed or sealed mode and the good bass response, good isolation, and ANC that mode provides.

FIG. 1 illustrates an example earpiece 102 implementing the techniques discussed herein. The earpiece 102 includes a speaker 104, a communication system 106, an earpiece mode selection system 108, an active noise cancellation (ANC) system 110, an ANC microphone 112, a noise estimate microphone 114, and a voice microphone 116.

Although illustrated with microphones 112, 114, and 116, it should be noted that in some situations the earpiece 102 does not include all three microphones. For example, the earpiece 102 may include the noise estimate microphone 114 and the voice microphone 116, but may not include the ANC microphone 112. In some situations the earpiece may include a single microphone that operates as only the voice microphone 116.

The speaker 104 can be configured as any suitable type of speaker incorporating a transducer that converts an electrical signal into sound, such as a dynamic loudspeaker using a diaphragm, a piezoelectric speaker, non-diaphragm based speakers, and so forth.

The communication system 106 manages communication with various other devices via a wireless or wired connection. The communication system 106 can manage communication with a variety of different types of computing or electronic devices, such as a smartphone or other wireless phone, a tablet computer, a laptop computer, a desktop computer, a wearable device (e.g., a smartwatch, an augmented reality headset or device, a virtual reality headset or device), a personal media player, a personal navigating device (e.g., global positioning system), an entertainment device (e.g., a gaming console, a portable gaming device, a streaming media player, a digital video recorder, a music or other audio playback device), an Internet of Things (IoT) device, an automotive computer, and so forth.

The earpiece mode selection system 108 determines whether a duct in the earpiece 102 is sealed (e.g., closed) or unsealed (e.g., open). The earpiece mode selection system 108 selects an earpiece mode based on whether the earpiece 102 is sealed or unsealed. The selected earpiece mode includes one or both of an active noise cancellation setting for the earpiece 102 and an equalization setting for the earpiece 102.

The earpiece mode selection system 108 can be implemented in a variety of different manners. For example, the earpiece mode selection system 108 can be implemented at least in part in hardware, e.g., as an application-specific integrated circuit (ASIC), a field-programmable gate array (FPGA), an application-specific standard product (ASSP), a system-on-a-chip (SoC), a complex programmable logic device (CPLD), and so forth. Additionally or alternatively, the earpiece mode selection system 108 can be implemented as multiple instructions stored on computer-readable storage media and that can be executed by a processing system (e.g., one or more processors (e.g., microprocessors or controllers) each of which can include one or more cores).

The ANC system 110 performs active noise cancellation for the earpiece 102. This noise cancellation can be performed in any of a variety of different manners, such as using a feed-forward technique or a feed-back technique as discussed in more detail below. The ANC system 110 can be implemented in a variety of different manners. For example, the ANC system 110 can be implemented at least in part in hardware, e.g., as an ASIC, an FPGA, an ASSP, an SoC, a CPLD, and so forth. Additionally or alternatively, the ANC system 110 can be implemented as multiple instructions stored on computer-readable storage media and that can be executed by a processing system (e.g., one or more processors (e.g., microprocessors or controllers) each of which can include one or more cores).

The ANC microphone 112, the noise estimate microphone 114, and the voice microphone 116 can each be any suitable type of microphone incorporating a transducer that converts sound into an electrical signal, such as a dynamic microphone, a condenser microphone, a piezoelectric microphone, and so forth. The ANC microphone 112, the noise estimate microphone 114, and the voice microphone 116 can be the same type or different types of microphones. It is to be appreciated that the earpiece 102 can include multiple ANC microphones 112, multiple noise estimate microphones 114, or multiple voice microphones 116.

The ANC microphone 112 picks up sound that the user hears (e.g., the ANC microphone 112 is situated to pick up sound in the user's ear canal). The ANC microphone 112 is typically situated in a front volume of the earpiece 102 as discussed in more detail below.

The noise estimate microphone 114 picks up sounds that are from the outside environment, such as noise generated by other people, music being played, sounds of vehicles, and so forth. The voice microphone 116 picks up the voice of the user. Accordingly, the noise estimate microphone 114 may be physically located in the earpiece 102 so that when the earpiece 102 is placed in user's ear the noise estimate microphone 114 is located further away from the mouth of the user than the voice microphone 116.

In one or more implementations, if the earpiece 102 includes both the voice microphone 116 and the noise estimate microphone 114, then the ANC system 110 may use feed-forward ANC as well as uplink noise suppression. Additionally or alternatively, if the earpiece 102 includes the voice microphone 116, the noise estimate microphone 114, and the ANC microphone 112, the earpiece 102 may use active ANC as well as uplink noise suppression.

Figure 2:
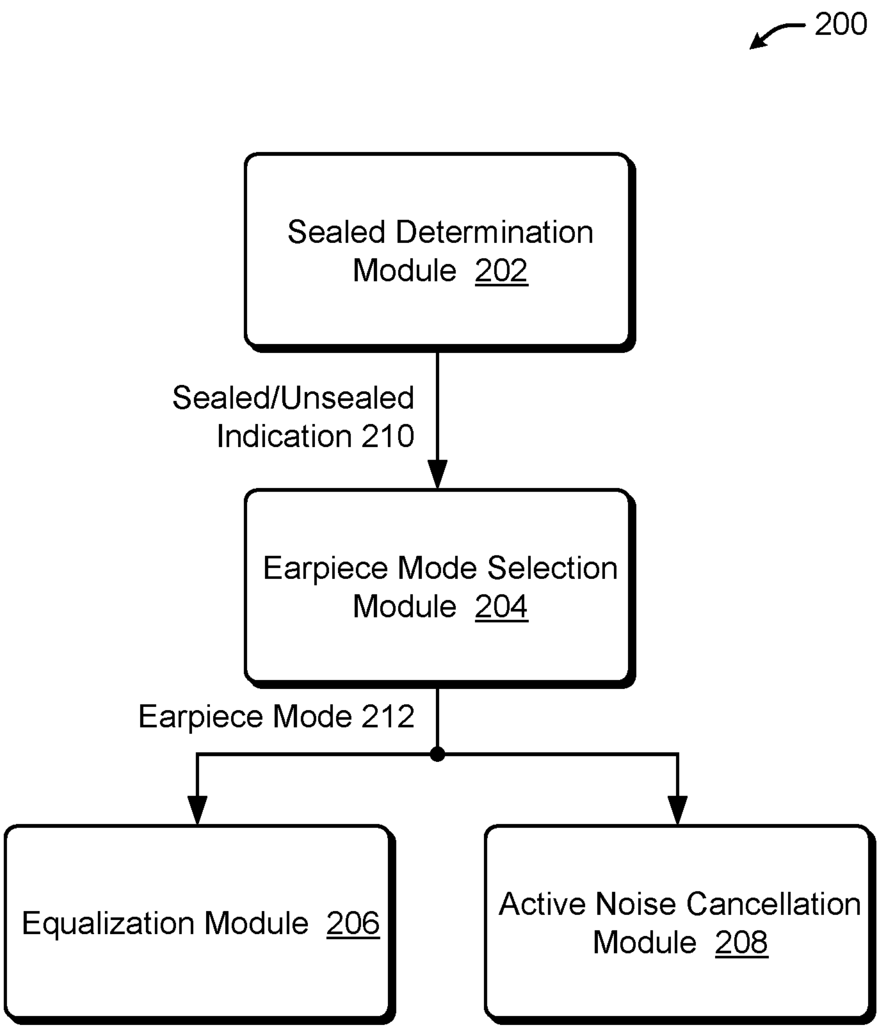
FIG. 2 illustrates an example earpiece mode selection system implementing the techniques discussed herein.

FIG. 2 illustrates an example earpiece mode selection system 200 implementing the techniques discussed herein. The earpiece mode selection system 200 is, for example, an earpiece mode selection system 108 of FIG. 1. The earpiece mode selection system 200 includes a sealed determination module 202, an earpiece mode selection module 204, an equalization (EQ) module 206, and an ANC module 208.

Figure 3A:
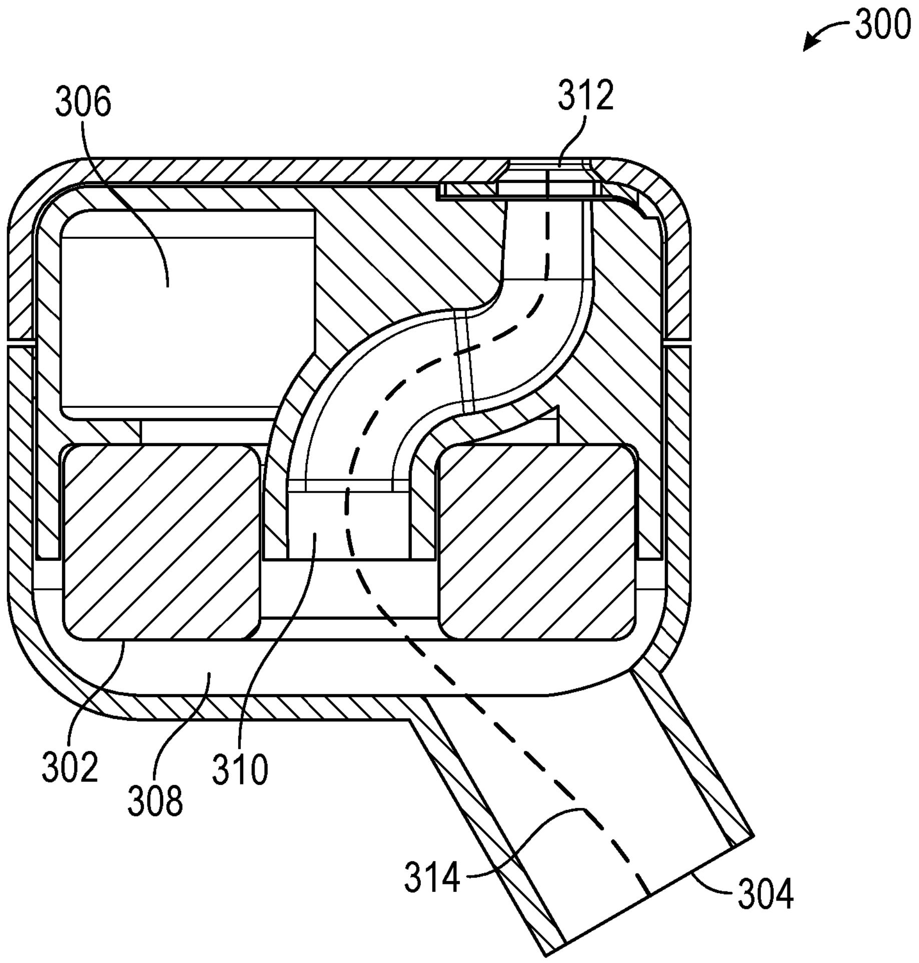
FIG. 3A illustrates an interior view of an example earpiece implementing the techniques discussed herein.

FIG. 3A illustrates an interior view of an example earpiece 300 implementing the techniques discussed herein. The earpiece 300 is, for example, an earpiece 102 of FIG. 1. The earpiece 300 includes a speaker 302, which can be a speaker 104 of FIG. 1. The speaker 302 transmits sound through an opening 304 to the ear canal of a user. The portion of the earpiece 300 that is situated in the user's ear canal may also be referred to as the ear tip. The earpiece 300 includes a back volume 306 that is generally the area behind the speaker 302 (e.g., opposite the opening 304). The earpiece also includes a front volume 308 that is generally the area in front of the speaker 302 (e.g., facing the opening 304).

In one or more implementations the back volume 306 is sealed and not open to the front volume 308 or the external environment (the environment external to the earpiece 300). Accordingly, the back volume 306 is also referred to as a sealed back volume. It should be noted that the referring to "sealed" herein allows for a barometric vent. For example, a sealed back value may not be entirely sealed—a small vent may be added to allow pressure equalization so that the back volume does not develop a DC offset, which can happen in a perfectly sealed system owing to changes in temperature (e.g., external temperature, internal or operating temperature), altitude or weather.

The earpiece 300 also includes a duct 310 that passes through the back volume 306 and the front volume 308. The duct 310 is sealed from the back volume 306, but not from the front volume 308. The duct 310 may be opened or closed using any of a variety of techniques as discussed in more detail below. When the duct 310 is unsealed (also referred to as open), sound from the external environment is able to enter the duct 310 at an opening 312, pass through the duct 310, and pass into the ear canal of the user via the opening 304 (e.g., as illustrated by dashed line 314). When the duct 310 is sealed (also referred to as closed), sound from the external environment is not able to pass through the duct 310 and into the ear canal of the user.

Figure 3B:
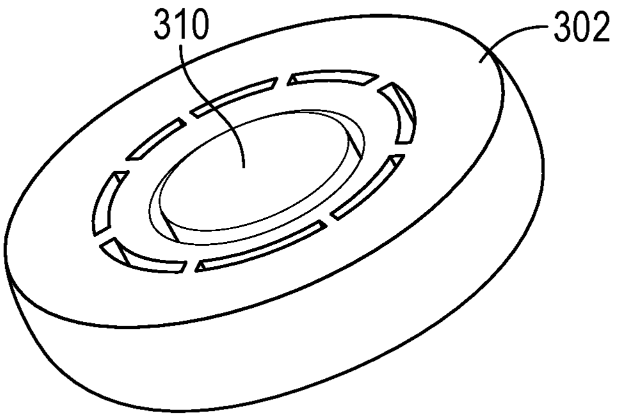
FIG. 3B illustrates another view of the speaker.

FIG. 3B illustrates another view of the speaker 302. The speaker 302 is a ring transducer and the duct 310 passes through an inner opening in the speaker 302.

Returning to FIG. 2, the sealed determination module 202 determines whether a duct in the earpiece 102 (e.g., the duct 310 of FIG. 3) is sealed or unsealed. The sealed determination module 202 provides a sealed/unsealed indication 210 to the earpiece mode selection module 204 indicating whether the duct is sealed or unsealed.

In one or more implementations, the earpiece mode selection module 204 selects an earpiece mode 212 based on the sealed/unsealed indication 210, such as a sealed mode or an unsealed mode, and outputs the earpiece mode 212 to the EQ module 206 and the ANC module 208. The EQ module 206 selects equalization settings for the earpiece speaker (e.g., speaker 104 of FIG. 1) based on the earpiece mode 212. The ANC module 208 selects ANC settings for the earpiece speaker (e.g., speaker 104 of FIG. 1) based on the earpiece mode 212.

Additionally or alternatively, the earpiece mode selection module 204 selects, based on the earpiece mode, the equalization settings and the ANC settings for the earpiece speaker.

In one or more implementations, the sealed determination module 202 determines whether the duct in the earpiece 102 is sealed or unsealed based at least in part on one or both of ANC microphone 112 and noise estimate microphone 114. The manner in which this determination is performed can vary based on a type of ANC being used, such as feed-forward or feed-back ANC.

In one or more implementations, ANC is performed using a feed-forward technique. For a feed-forward technique, the noise estimate microphone 114 measures noise. This signal is inverted by the ANC system 110 and fed to the speaker 104 such that noise making it past the earpiece 102 to the ear itself can be cancelled. The noise estimate microphone 114 listens for how much of the audio content being sent to the user's ear canal by the speaker 104 is leaking. If the leakage is above a certain threshold amount (e.g., 10 dB more leakage than expected for sealed condition), then the sealed determination module 202 determines that the duct in the earpiece 102 is unsealed. Otherwise, the sealed determination module 202 determines that the duct in the earpiece 102 is sealed. Using this technique provides a low-cost and low-complexity approach to determining whether the duct is sealed or unsealed.

Additionally or alternatively, ANC is performed using a feed-back technique. For a feed-back technique, the ANC microphone 112 is situated in front of the speaker 104 (e.g., in front of the diaphragm), or between the speaker 104 and the user's ear canal. The sound (e.g., noise) measured at the noise estimate microphone 114 is compared to the sound (e.g., noise) measured at the ANC microphone 112 to determine how much noise cancellation is actually occurring.

By comparing the noise estimate with how much cancellation is actually occurring, the ANC system 110 can dynamically adjust the amount of cancellation sent to the speaker 104. This allows a more consistent listening experience, and allows for more aggressive cancellation of the noise, because there is less concern of sending too much noise canceling signal, which would amplify the noise instead of attenuating it.

With a feed-back system, the sealed determination module 202 compares the bass response measured at the ANC microphone 112 from the audio content to the expected bass response. If the difference in bass response is greater than a threshold amount then the sealed determination module 202 determines that the duct in the earpiece 102 is unsealed. Otherwise, the sealed determination module 202 determines that the duct in the earpiece 102 is sealed. For example, at 50 hertz (Hz), if the difference in bass response is greater than 20 decibels (dB), then the sealed determination module 202 determines that the duct in the earpiece 102 is unsealed. However, if the difference in bass response is not greater than 20 dB, then the sealed determination module 202 determines that the duct in the earpiece 102 is sealed.

Additionally or alternatively, with a feed-back system, the sealed determination module 202 compares the bass response measured at the ANC microphone 112 from the audio content to the expected bass response for both a sealed earpiece and an unsealed earpiece. If the bass response measured at the ANC microphone 112 is closer to the expected bass response for an unsealed earpiece than to the expected bass response for a sealed earpiece, then the sealed determination module 202 determines that the duct in the earpiece is unsealed. However, if the bass response measured at the ANC microphone 112 is closer to the expected bass response for a sealed earpiece than the expected bass response for an unsealed earpiece, then the sealed determination module 202 determines that the duct in the earpiece is sealed.

Figure 4:
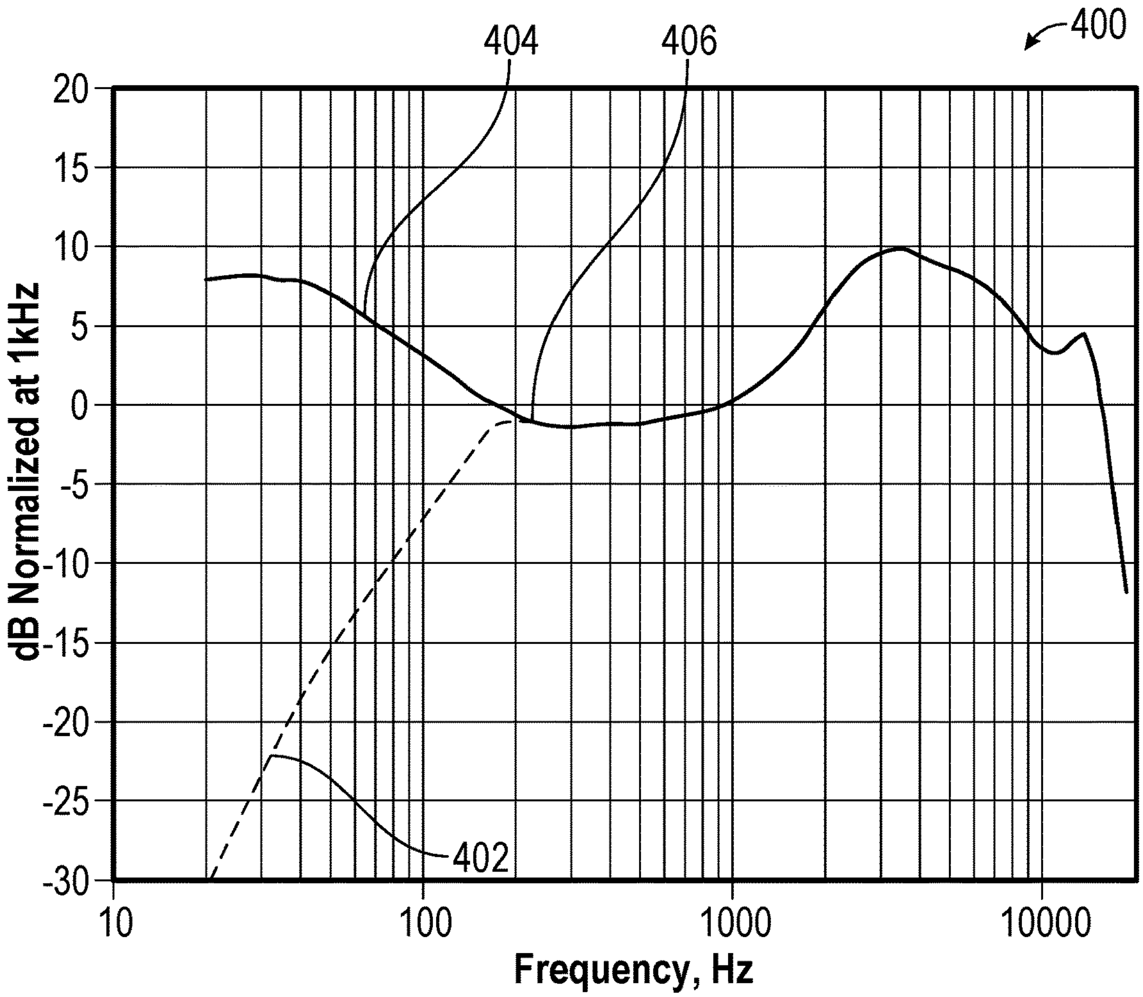
FIG. 4 illustrates an example of expected responses for sealed and unsealed earpiece ducts.

FIG. 4 illustrates an example 400 of expected responses for sealed and unsealed earpiece ducts. Decibels normalized at 1 kilohertz (kHz) is shown along the vertical (e.g., y) axis and frequency in Hz is shown along the horizontal (e.g., x) axis. The expected bass response (e.g., below approximately 200 Hz) for an open duct is illustrated with a dashed line 402 and the expected bass response for a closed duct is illustrated with a solid line 404. At 406 (e.g., above approximately 200 Hz), the expected responses are approximately the same for both an open duct and a closed duct. Accordingly, if the bass response measured by the ANC microphone 112 is closer to dashed line 402 than solid line 404 then the earpiece is unsealed. However, if the bass response measured by the ANC microphone 112 is closer to solid line 404 than dashed line 402 then the earpiece is unsealed.

Returning to FIG. 2, additionally or alternatively, with a feed-back system, the sealed determination module 202 compares the audio content measured at the noise estimate microphone 114 to the audio content measured at the ANC microphone 112. If the difference in the audio content measured by the two microphones is greater than a threshold amount (e.g., 10 dB at a given frequency, such as 50 Hz) then the sealed determination module 202 determines that the duct in the earpiece 102 is unsealed. Otherwise, the sealed determination module 202 determines that the duct in the earpiece 102 is sealed.

Additionally or alternatively, the sealed determination module 202 can use other techniques to determine whether the duct is sealed or unsealed, such as techniques that do not rely on the ANC microphone 112 or the noise estimate microphone 114. For example, the sealed determination module 202 can use a Hall effect sensor and magnet, a contact circuit, a potentiometer, and so forth to determine whether the duct is sealed or unsealed.

The EQ module 206 applies equalization settings for the earpiece speaker. The EQ module 206 may select the equalization settings based on the earpiece mode 212 or the earpiece mode selection module 204 may provide the equalization settings to the EQ module 206. The equalization settings indicate to boost or lower (e.g., increase or decrease the loudness) of particular frequency ranges. The equalization settings for a sealed mode can differ from the equalization settings for an unsealed mode. For example, low frequency ranges (e.g., corresponding to bass) may be boosted in the sealed mode but lowered in the unsealed mode. The particular equalization settings for different modes can be determined in different manners, such as selected by a developer or designer of the earpiece 102, selected by a user of the earpiece 102 (e.g., set as user preferences), and so forth.

The ANC module 208 applies ANC settings for the earpiece speaker. The ANC module 208 may select the ANC setting based on the earpiece mode 212 or the earpiece mode selection module 204 may provide the ANC setting to the ANC module 208. In one or more implementations, the ANC setting is to activate ANC for the sealed mode (in case the ANC system 110 performs ANC) and deactivate ANC for the unsealed mode (in which case the ANC system 110 does not perform ANC).

Figure 5:
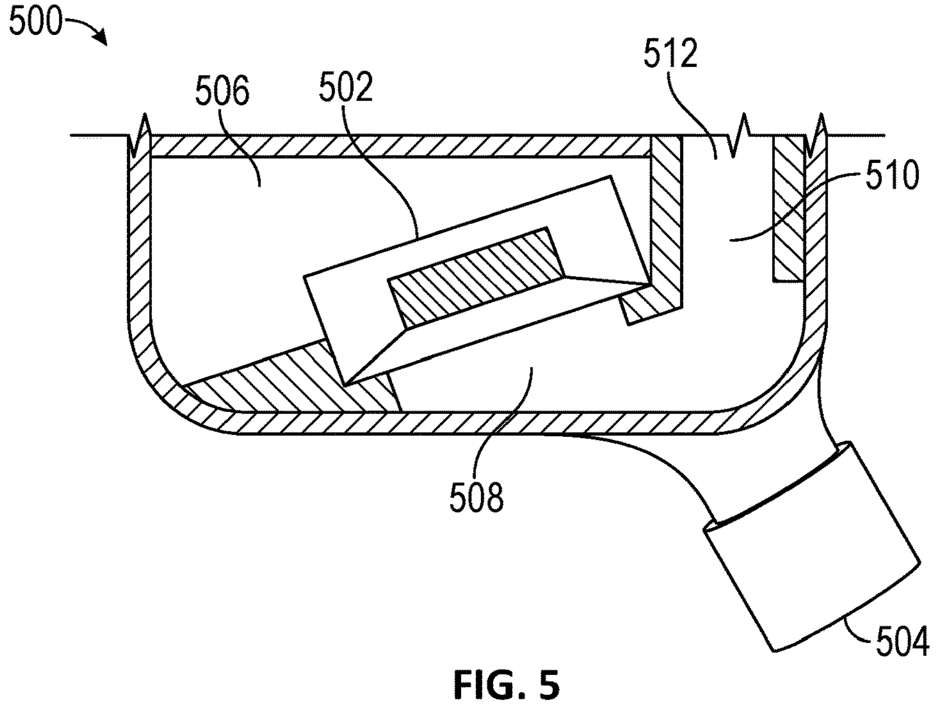
FIG. 5 illustrates an interior view of another example earpiece implementing the techniques discussed herein.

FIG. 5 illustrates an interior view of another example earpiece 500 implementing the techniques discussed herein. The earpiece 500 is, for example, an earpiece 102 of FIG. 1. The earpiece 500 includes a speaker 502, which can be a speaker 104 of FIG. 1. The speaker 502 transmits sound through an opening 504 to the ear canal of a user. The earpiece 500 includes a back volume 506 that is generally the area behind the speaker 502 (e.g., opposite the opening 504). The earpiece also includes a front volume 508 that is generally the area in front of the speaker 502 (e.g., facing the opening 504). In one or more implementations the back volume 506 is sealed and not open to the front volume 508 or the external environment (the environment external to the earpiece 500). Accordingly, the back volume 506 is also referred to as a sealed back volume.

The earpiece 500 also includes a duct 510 that passes through the back volume 506 and the front volume 508. The duct 510 is sealed from the back volume 506, but not from the front volume 508. The duct 510 may be opened or closed using any of a variety of techniques as discussed in more detail below. When the duct 510 is unsealed (also referred to as open), sound from the external environment is able to enter the duct 510 at an opening 512, pass through the duct 510, and pass into the ear canal of the user via the opening 504. When the duct 510 is sealed (also referred to as closed), sound from the external environment is not able to pass through the duct 510 and into the ear canal of the user.

Figure 6:
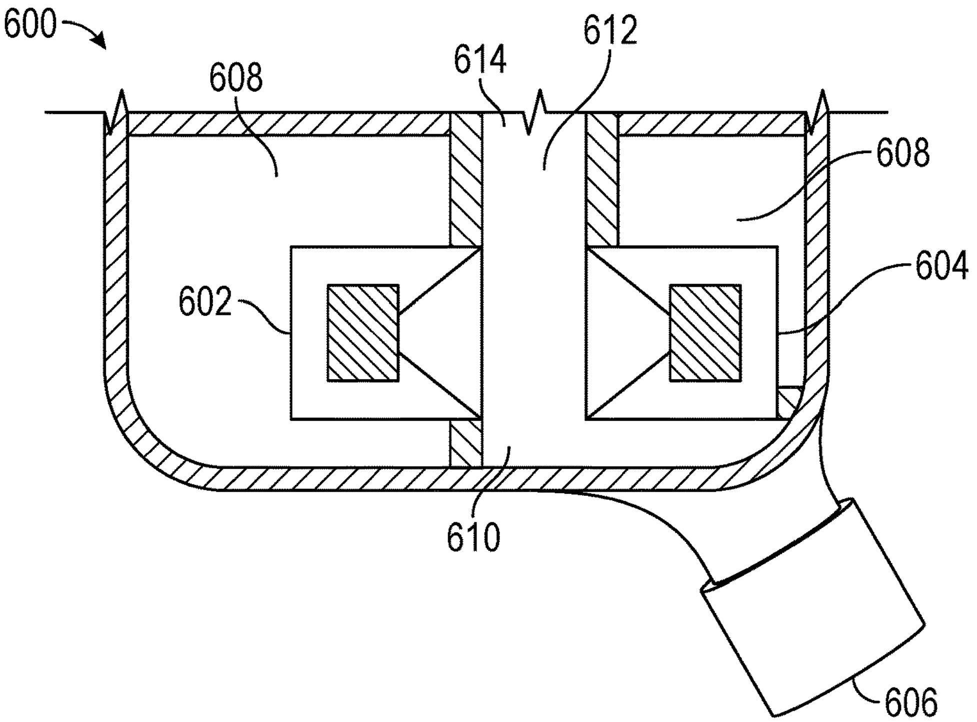
FIG. 6 illustrates an interior view of another example earpiece implementing the techniques discussed herein.

FIG. 6 illustrates an interior view of another example earpiece 600 implementing the techniques discussed herein. The earpiece 600 is, for example, an earpiece 102 of FIG. 1. The earpiece 600 includes multiple transducers 602 and 604 that are parallel to one another and that together form a speaker, which can be a speaker 104 of FIG. 1. The transducers 602 and 604 transmit sound through an opening 606 to the ear canal of a user. The earpiece 600 includes a back volume 608 that is generally the area behind the transducers 602 and 604 (e.g., opposite the opening 606). The earpiece also includes a front volume 610 that is generally the area in front of the transducers 602 and 604 (e.g., facing the opening 606). In one or more implementations the back volume 608 is sealed and not open to the front volume 610 or the external environment (the environment external to the earpiece 600). Accordingly, the back volume 608 is also referred to as a sealed back volume.

The earpiece 600 also includes a duct 612 that passes through the back volume 608. The duct 612 is sealed from the back volume 608, but not from the front volume 610. The duct 612 may be opened or closed using any of a variety of techniques as discussed in more detail below. When the duct 612 is unsealed (also referred to as open), sound from the external environment is able to enter the duct 612 at an opening 614, pass through the duct 612, and pass into the ear canal of the user via the opening 606. When the duct 612 is sealed (also referred to as closed), sound from the external environment is not able to pass through the duct 612 and into the ear canal of the user.

Figure 7A:
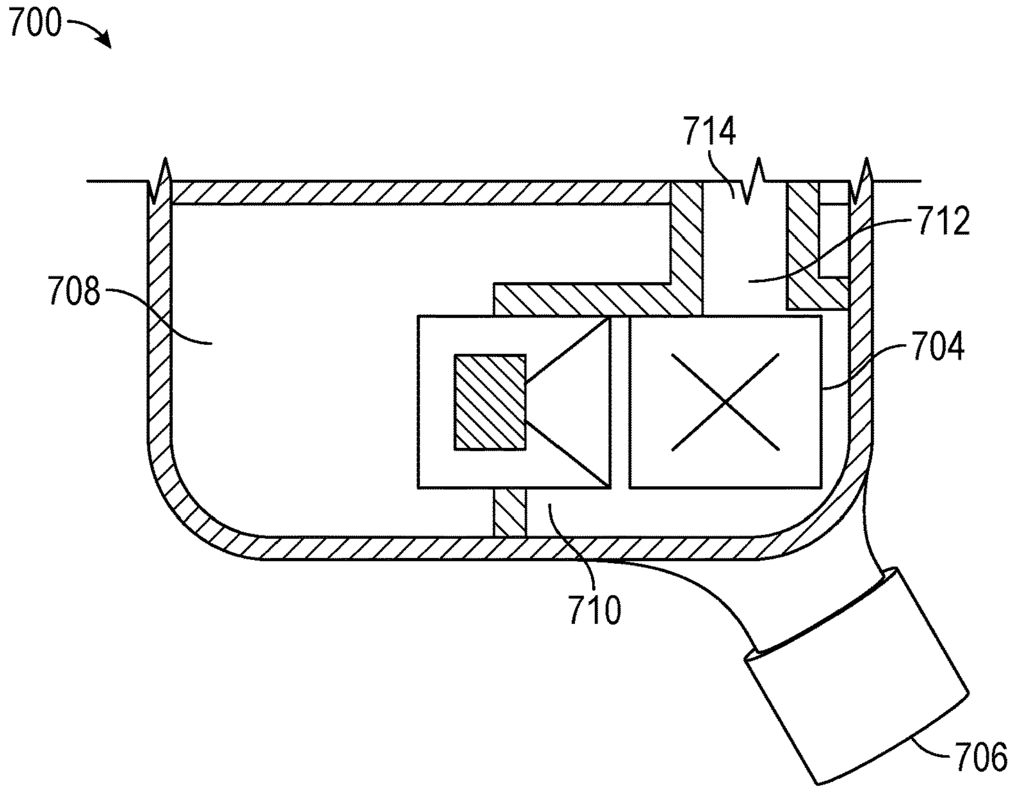
FIGS. 7A and 7B illustrate another example earpiece implementing the techniques discussed herein.
Figure 7B:
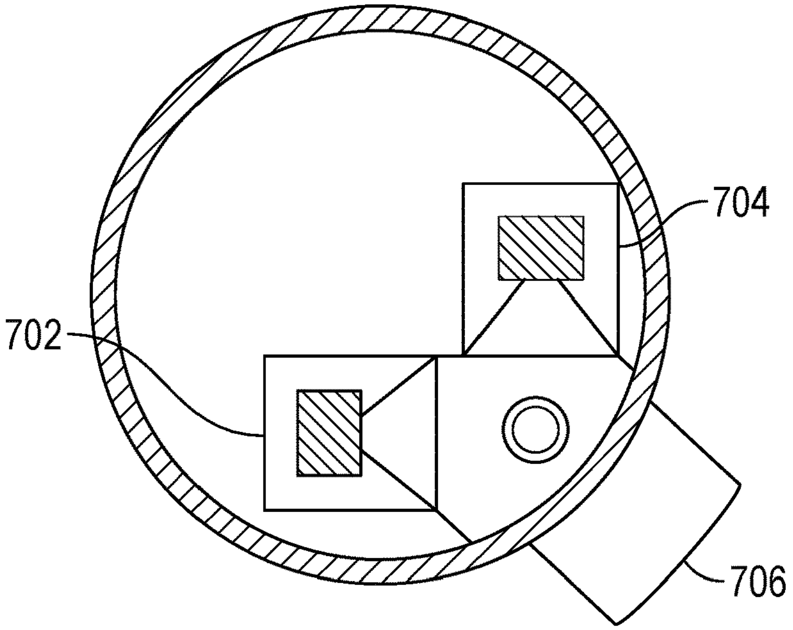

FIGS. 7A and 7B illustrate another example earpiece 700 implementing the techniques discussed herein. FIG. 7A illustrates a side interior view of the earpiece 700 and FIG. 7B illustrates a top interior view of the earpiece 700. The earpiece 700 is, for example, an earpiece 102 of FIG. 1. The earpiece 700 includes multiple transducers 702 and 704 that are distal each another and together form a speaker, which can be a speaker 104 of FIG. 1. The transducers 702 and 704 transmit sound through an opening 706 to the ear canal of a user. In one or more implementations earpiece 700 includes a back volume 708 that is sealed and not open to the front volume 710 or the external environment (the environment external to the earpiece 700). Accordingly, the back volume 708 is also referred to as a sealed back volume.

The earpiece 700 also includes a duct 712 that passes through the back volume 708. The duct 712 is sealed from the back volume 708, but not from the front volume 710. The duct 712 may be opened or closed using any of a variety of techniques as discussed in more detail below. When the duct 712 is unsealed (also referred to as open), sound from the external environment is able to enter the duct 712 at an opening 714, pass through the duct 712, and pass into the ear canal of the user via the opening 706. When the duct 712 is sealed (also referred to as closed), sound from the external environment is not able to pass through the duct 712 and into the ear canal of the user.

As discussed above, the earpiece (e.g., earpiece 102 of FIG. 1, earpiece 300 of FIG. 3, earpiece 500 of FIG. 5, earpiece 600 of FIG. 6, earpiece 700 of FIG. 7) includes a duct from an ear canal of the user to the external environment, and this duct may be opened (and thus unsealed) or closed (and thus sealed). The duct may be opened or closed in any of a variety of different manners. For example, the duct may be closed by moving a solid piece of material (e.g., which may be referred to as a grommet or gasket) into a position that seals or blocks the duct. Such a grommet or gasket can be made of various materials, such as rubber, foam, silicone, overmolded elastomers, and so forth.

Figure 8A:
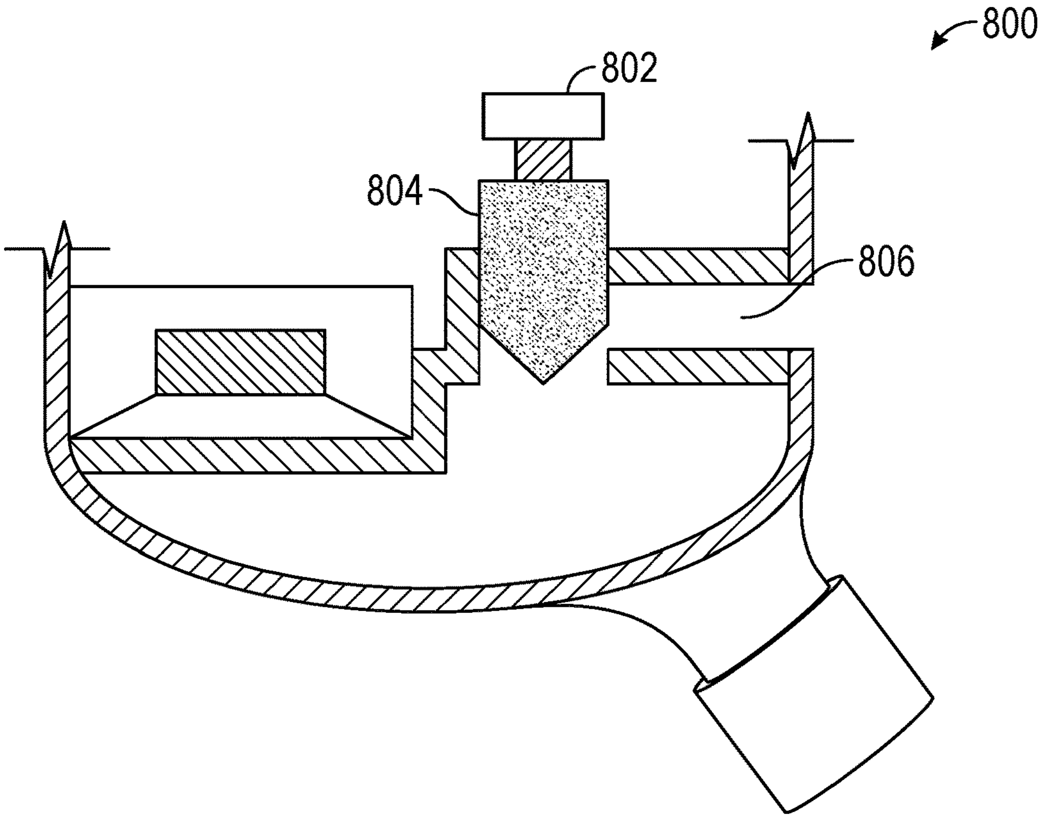
FIGS. 8A and 8B illustrate a sealing technique for an example earpiece implementing the techniques discussed herein.
Figure 8B:
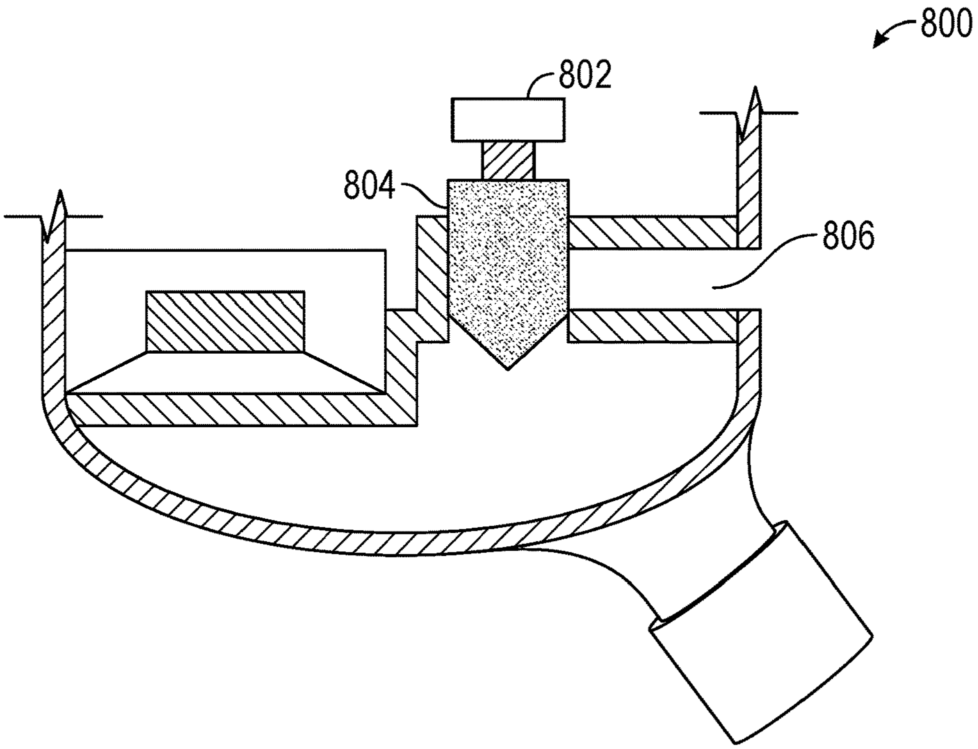

FIGS. 8A and 8B illustrate a sealing technique for an example earpiece 800 implementing the techniques discussed herein. The earpiece 800 is, for example, an earpiece 102 of FIG. 1. FIGS. 8A and 8B illustrate side interior views of the earpiece 800. The earpiece 800 includes a linear actuator 802 to move a grommet 804. The grommet 804 is a solid object that may be made of various materials, such as rubber, foam, silicone, overmolded elastomers, and so forth, which may seal or close the duct 806. The grommet 804 may block a duct 806 to seal or close the duct 806 as illustrated in FIG. 8B, or not block the duct 806 to unseal or open the duct 806 as illustrated in FIG. 8A. The linear actuator 802 holds sufficient pressure to maintain a seal when sealed or closed.

In one or more implementations the linear actuator 802 is electrically controlled and activated in any of a variety of different manners such as using a button, using an application setting, using a user gesture, using a voice command, and so forth.

Figure 9A:
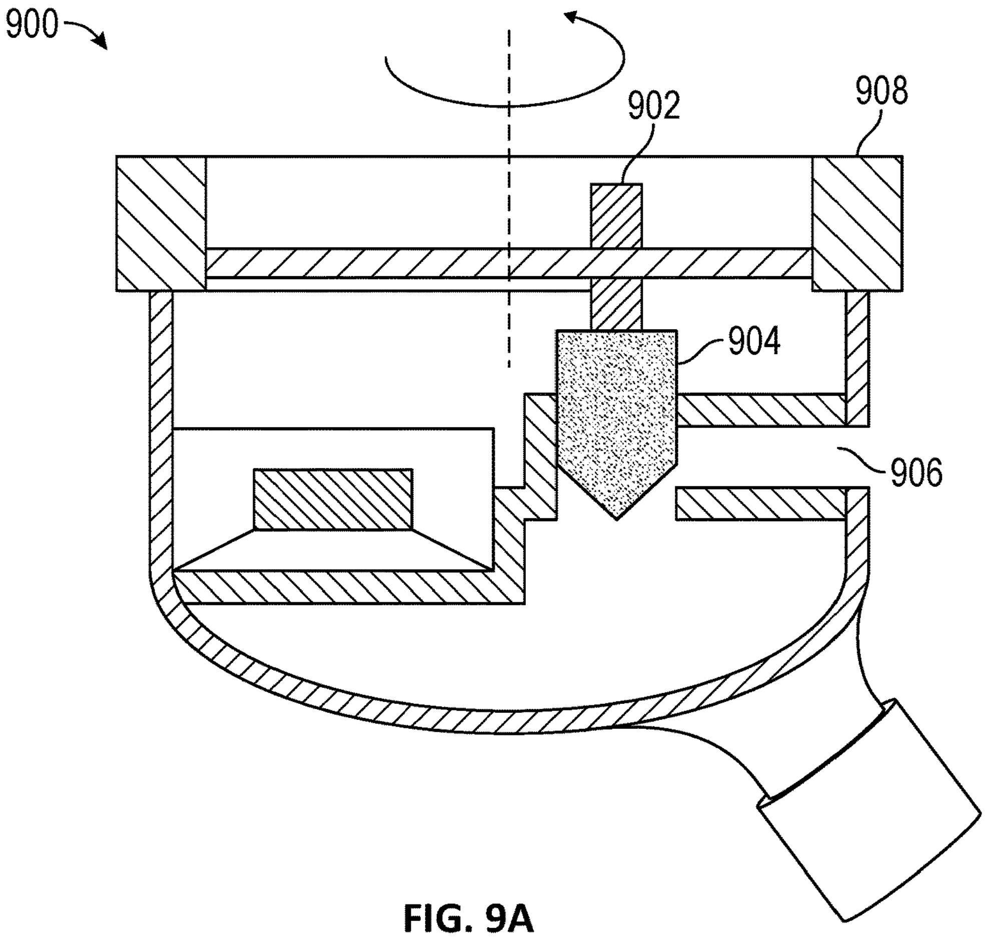
FIGS. 9A, 9B, and 9C illustrate another sealing technique for an example earpiece implementing the techniques discussed herein.
Figure 9B:
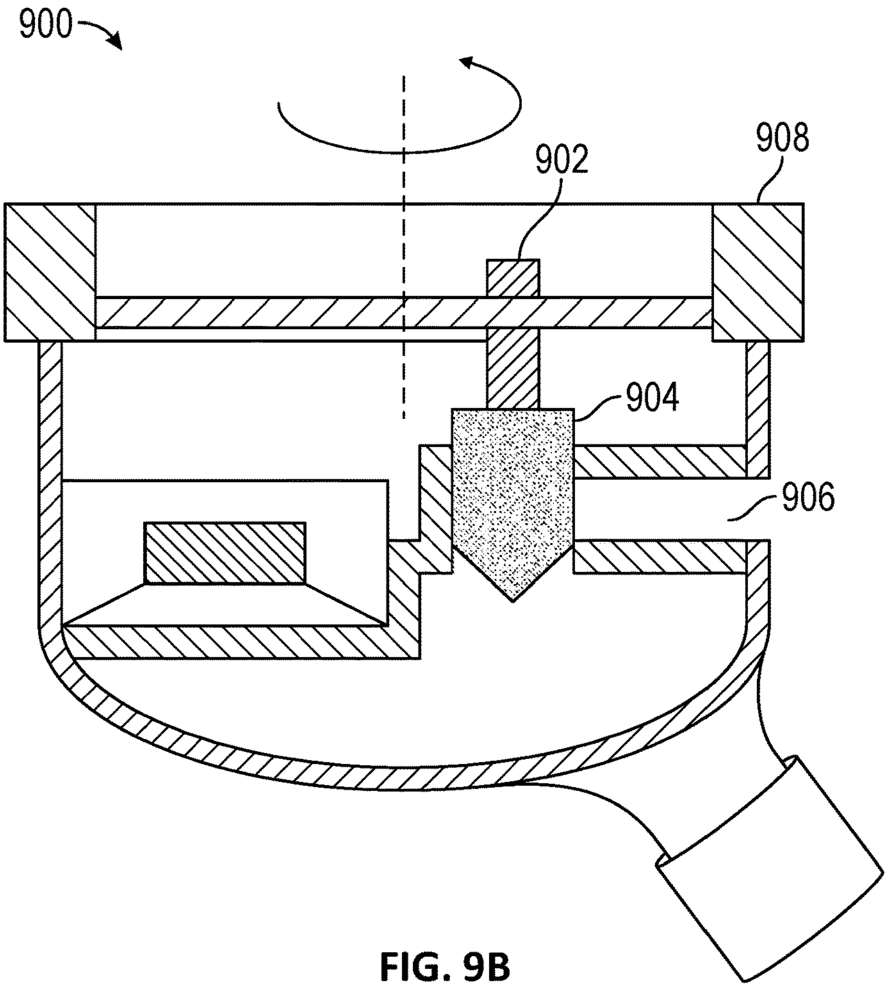
Figure 9C:
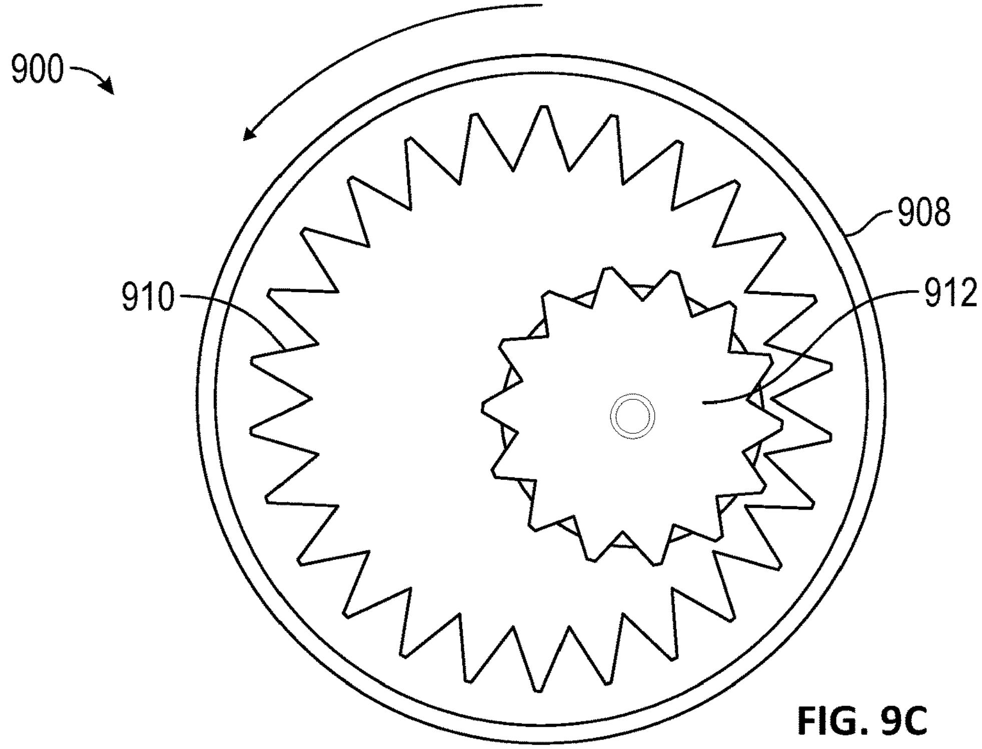

FIGS. 9A, 9B, and 9C illustrate another sealing technique for an example earpiece 900 implementing the techniques discussed herein. FIGS. 9A and 9B illustrate side interior views of the earpiece 900 and FIG. 9C illustrates a top interior view of the earpiece 900. The earpiece 900 is, for example, an earpiece 102 of FIG. 1. The earpiece 900 includes a lead screw 902 that moves a grommet 904. The grommet 904 is a solid object that may be made of various materials, such as rubber, foam, silicone, overmolded elastomers, and so forth, which may seal or close a duct 906. The grommet 904 may block the duct 906 to seal or close the duct 906 as illustrated in FIG. 9B, or not block the duct 906 to unseal or open the duct 906 as illustrated in FIG. 9A. The lead screw 902 is locked into place, holding sufficient pressure to maintain a seal on the duct 906 when sealed or closed.

The sealing technique illustrated in FIGS. 9A, 9B, and 9C is similar to that illustrated in FIGS. 8A and 8B, but differs in that a rotational motion is used to drive the grommet 904 up and down rather than a linear actuator. An outer surface 908 of the earpiece 900 includes a gear 910 that drives another gear 912 that attached to the lead screw 902. As the outer surface 908 is rotated in one direction (e.g., clockwise), the rotation causes the gear 912 to rotate and drive the grommet 904 down to seal or close the duct 906. As the outer surface 908 is rotated in the opposite direction (e.g., counterclockwise), the rotation causes the gear 912 to rotate and drive the grommet 904 up to unseal or open the duct 906.

Figure 10A:
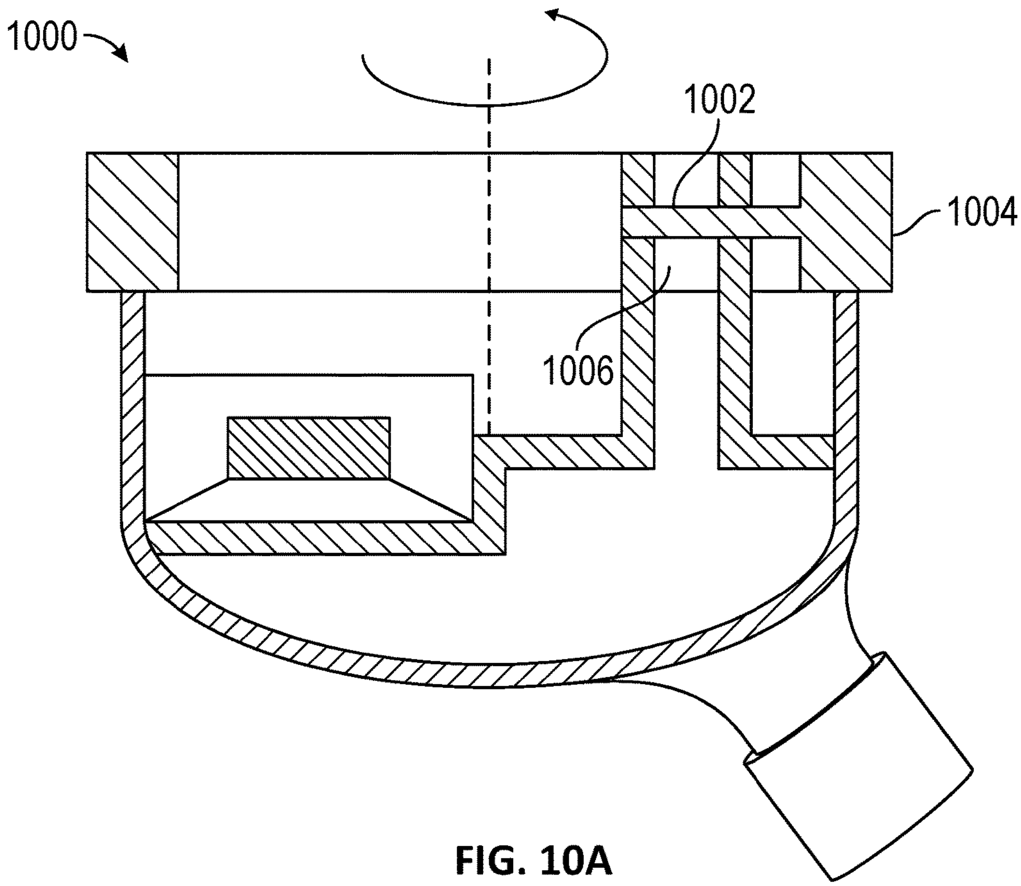
FIGS. 10A, 10B, and 10C illustrate another sealing technique for an example earpiece implementing the techniques discussed herein.
Figure 10B:
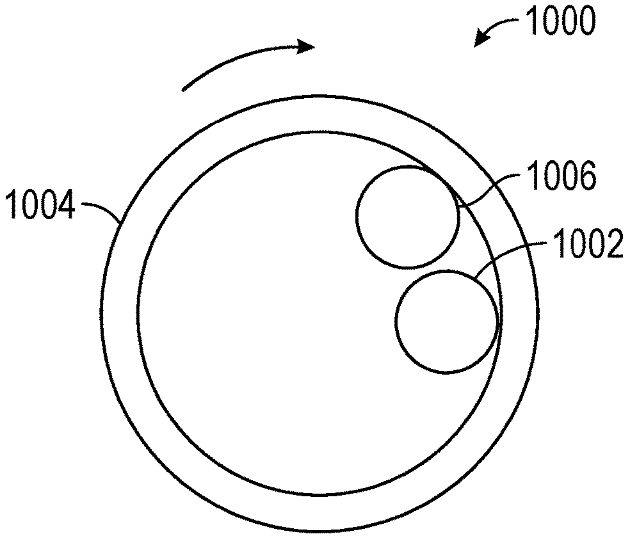
Figure 10C:
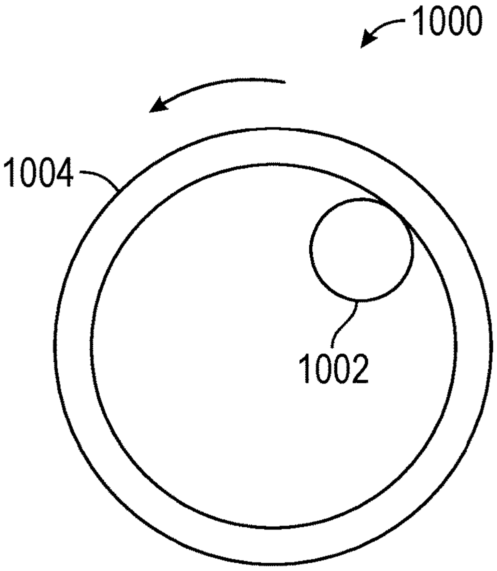

FIGS. 10A, 10B, and 10C illustrate another sealing technique for an example earpiece 1000 implementing the techniques discussed herein. FIG. 10A illustrates a side interior view of the earpiece 1000, FIGS. 10B and 10C illustrate top interior views of the earpiece 1000. The earpiece 1000 is, for example, an earpiece 102 of FIG. 1. The earpiece 1000 includes a grommet 1002 connected to an outer ring 1004. The grommet 1002 is a solid object that may be made of various materials, such as rubber, foam, silicone, overmolded elastomers, and so forth, which may seal or close a duct 1006.

The sealing technique illustrated in FIGS. 10A, 10B, and 10C uses a rotational motion to move the grommet 1002 into a position that seals (or unseals) the duct 1006. In one or more implementations, the grommet is rotatable or slideable in a plane that is at least approximately normal to an exterior piece (e.g., a cap) of the earpiece 1000. As the outer ring 1004 is rotated in one direction (e.g., clockwise), the rotation causes the grommet 1002 to move (e.g., rotate or slide) in a clockwise direction and unseal or open the duct 1006 as shown in FIG. 10B. As the outer ring 1004 is rotated in the opposite direction (e.g., counterclockwise), the rotation causes the grommet 1002 to move (e.g., rotate or slide) in a counterclockwise direction and seal or close the duct 1006 as shown in FIG. 10C.

In one or more implementations, the outer ring 1004 is part of a twisting cap of the earpiece 1000. The twisting cap may be mounted to the back volume of the earpiece 1000 in various manners, such as using a tongue and groove style snap around the circumference of the cap. This mounting of the twisting cap may be implemented, for example, as an axial snap in a top surface of the cap or another axial mounting from inside the sealed back volume.

Figure 11A:
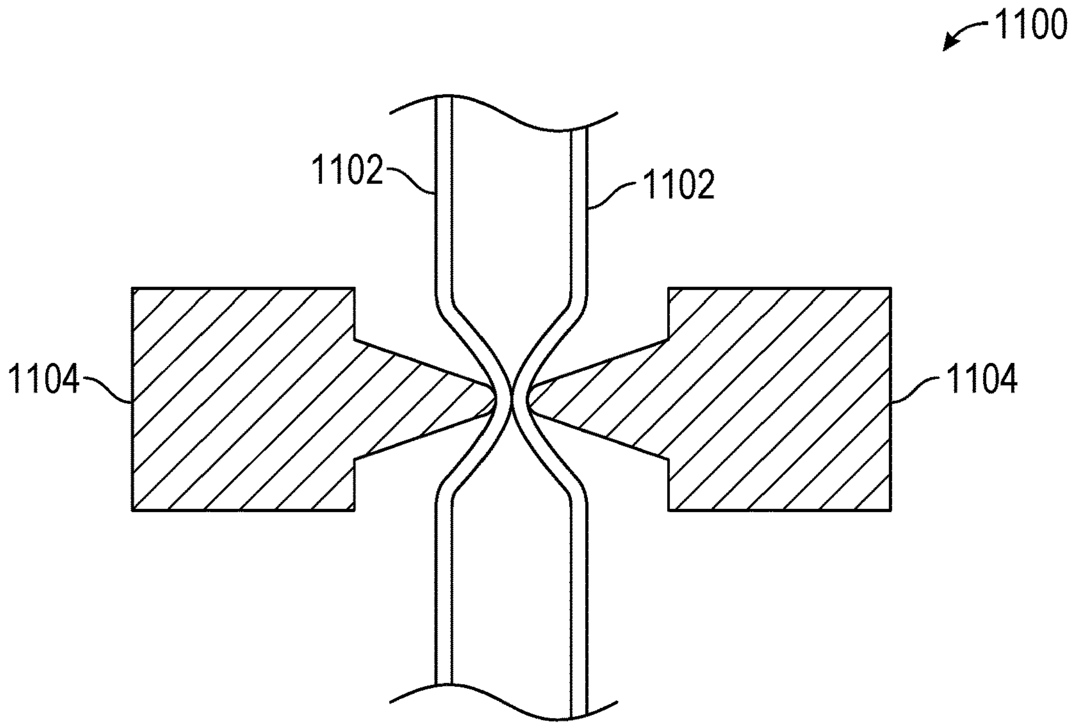
FIGS. 11A and 11B illustrate another sealing technique for an example earpiece implementing the techniques discussed herein.
Figure 11B:
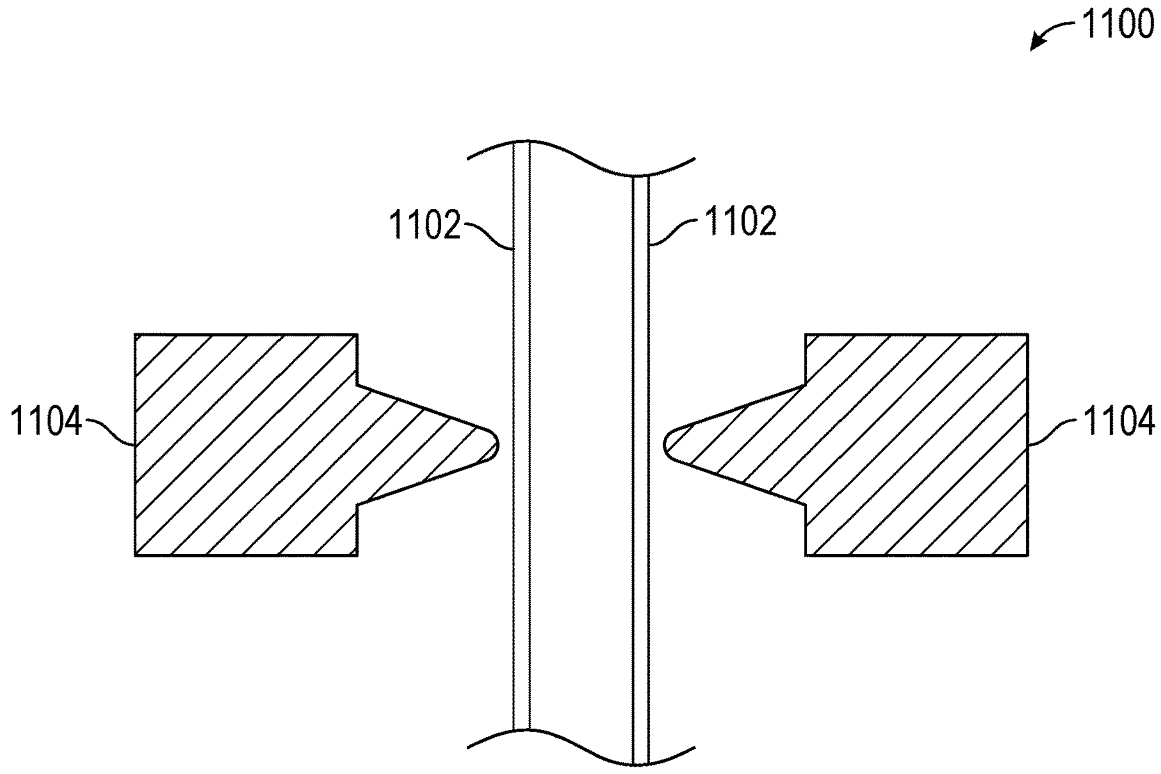

FIGS. 11A and 11B illustrate another sealing technique for an example earpiece 1100 implementing the techniques discussed herein. The earpiece 1100 is, for example, an earpiece 102 of FIG. 1. FIGS. 11A and 11B illustrate side interior views of a duct 1102. The duct 1102 is a port made of a flexible material that can be closed by pinching or kinking the tube using a grommet 1104, sealing or closing the duct 1102 as illustrated in FIG. 11A. Seal pressure is maintained using a snap or detent to hold the grommet 1104 in place. The port can be opened by unpinching or unkinking the tube using the grommet 1104, unsealing or opening the duct 1102 as illustrated in FIG. 11B. The grommet 1104 is a solid object that may be made of various materials, such as rubber, foam, silicone, overmolded elastomers, and so forth.

Figure 12:
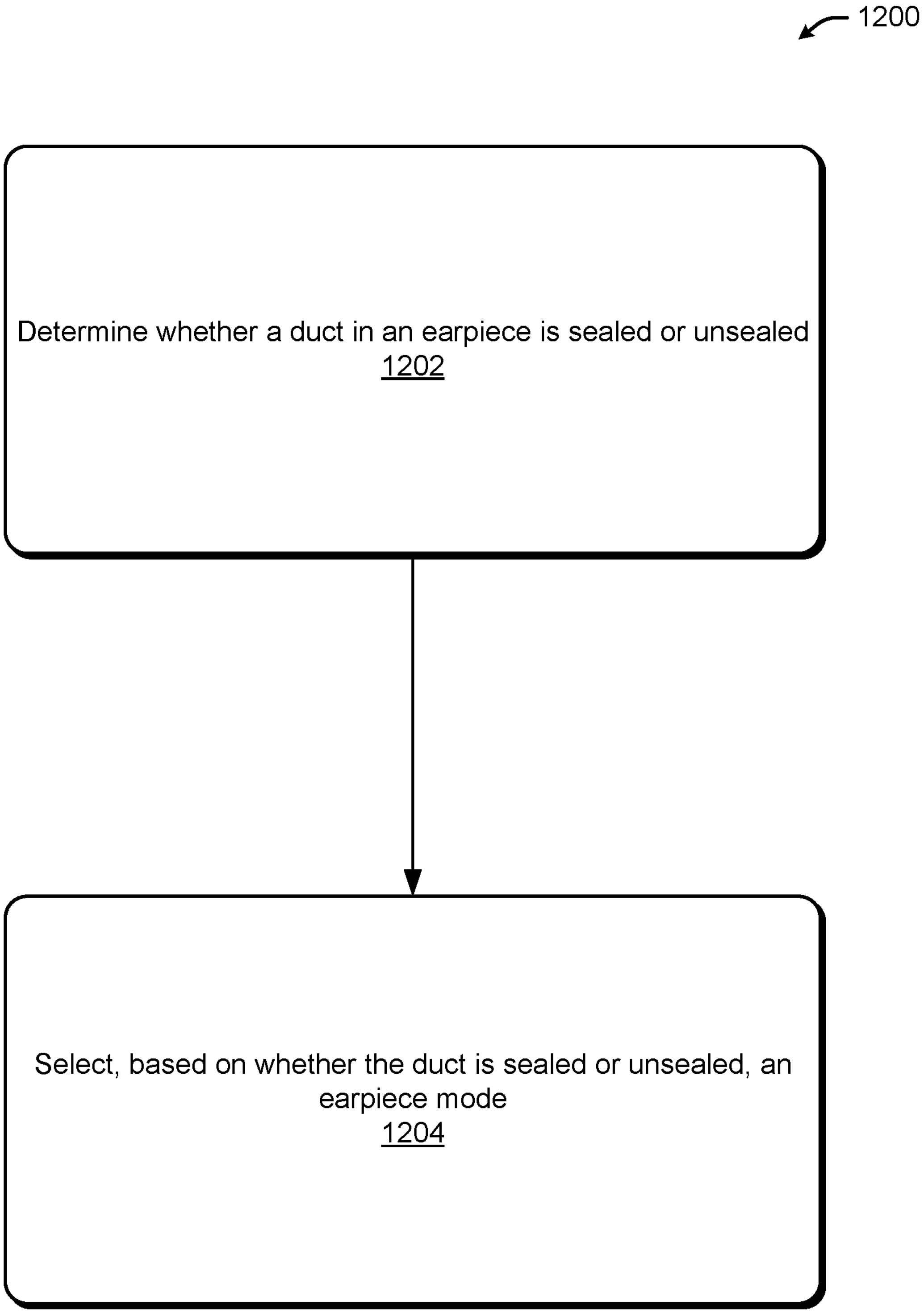
FIG. 12 illustrates an example process for implementing the techniques discussed herein in accordance with one or more embodiments.

FIG. 12 illustrates an example process 1200 for implementing the techniques discussed herein in accordance with one or more embodiments. Process 1200 is carried out by a mode selection system, such as earpiece mode selection system 108 of FIG. 1 or earpiece mode selection system 200 of FIG. 2, and can be implemented in software, firmware, hardware, or combinations thereof. Process 1200 is shown as a set of acts and is not limited to the order shown for performing the operations of the various acts.

In process 1200, a determination is made whether a duct in an earpiece is sealed or unsealed (act 1202). This determination is made based at least in part on audio measurements at a microphone of an earpiece. The duct is an opening allowing sound to pass between an opening to an ear canal of a user and an external environment.

An earpiece mode is selected based on whether the duct is sealed or unsealed (act 1204). The earpiece mode includes one or both of an active noise cancellation setting for the earpiece and an equalization setting for the earpiece.

Figure 13:
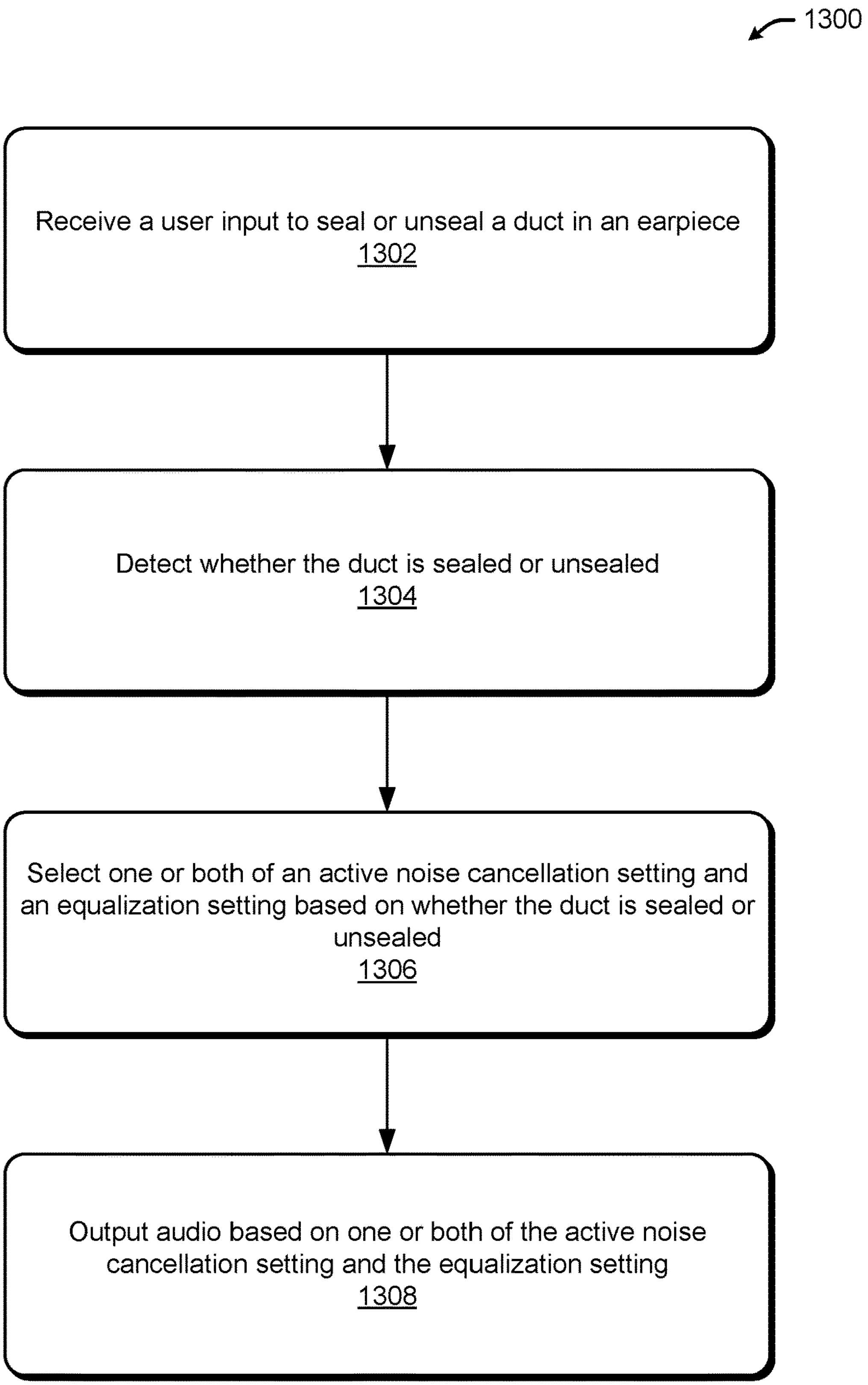
FIG. 13 illustrates another example process for implementing the techniques discussed herein in accordance with one or more embodiments.

FIG. 13 illustrates an example process 1300 for implementing the techniques discussed herein in accordance with one or more embodiments. Process 1300 is carried out by an earpiece mode selection system, such as earpiece mode selection system 108 of FIG. 1 or earpiece mode selection system 200 of FIG. 2, and can be implemented in software, firmware, hardware, or combinations thereof. Process 1300 is shown as a set of acts and is not limited to the order shown for performing the operations of the various acts.

In process 1300, a user input to seal or unseal a duct in an earpiece is received (act 1302). The duct is an opening allowing sound to pass between an opening to an ear canal of a user and an external environment.

Whether the duct is sealed or unsealed is detected (act 1304).

One or both of an active noise cancellation setting for the earpiece and an equalization setting for the earpiece is selected (act 1306). This selection is made based on whether the duct is sealed or unsealed.

Audio is output based on one or both of the active noise cancellation setting and the equalization setting (act 1308). This active noise cancellation setting and equalization setting are the settings selected in act 1306.

Figure 14:
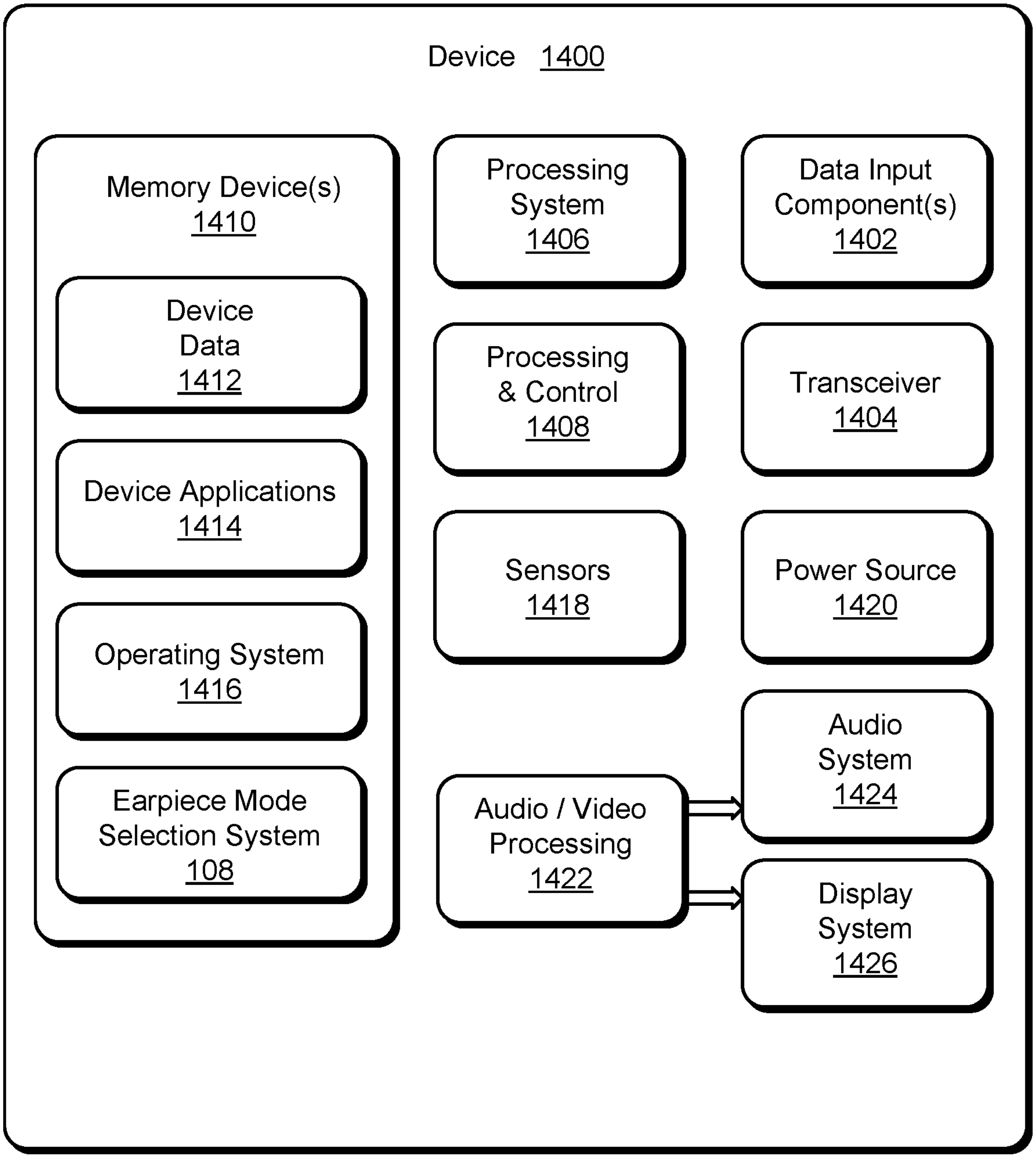
FIG. 14 illustrates various components of an example electronic device that can implement embodiments of the techniques discussed herein.

FIG. 14 illustrates various components of an example electronic device that can implement embodiments of the techniques discussed herein. The electronic device 1400 can be implemented as any of the devices described with reference to the previous FIG.s, such as any type of client device, mobile phone, tablet, computing, communication, entertainment, gaming, media playback, or other type of electronic device. In one or more embodiments the electronic device 1400 includes the earpiece mode selection system 108 (which may also be the earpiece mode selection system 200), described above.

The electronic device 1400 includes one or more data input components 1402 via which any type of data, media content, or inputs can be received such as user-selectable inputs, messages, music, television content, recorded video content, and any other type of text, audio, video, or image data received from any content or data source. The data input components 1402 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 1402 may also include various other input components such as microphones, touch sensors, touchscreens, keyboards, and so forth.

The device 1400 includes communication transceivers 1404 that enable one or both of wired and wireless communication of device data with other devices. The device data can include any type of text, audio, video, image data, or combinations thereof. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, wired local area network (LAN) Ethernet transceivers for network data communication, and cellular networks (e.g., third generation networks, fourth generation networks such as LTE networks, or fifth generation networks).

The device 1400 includes a processing system 1406 of one or more processors (e.g., any of microprocessors, controllers, and the like) or a processor and memory system implemented as a system-on-chip (SoC) that processes computer-executable instructions. The processing system 1406 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon or other hardware.

Alternately or in addition, the device can be implemented with any one or combination of software, hardware, firmware, or fixed logic circuitry that is implemented in connection with processing and control circuits, which are generally identified at 1408. The device 1400 may further include any type of a system bus or other data and command transfer system that couples the various components within the device. A system bus can include any one or combination of different bus structures and architectures, as well as control and data lines.

The device 1400 also includes computer-readable storage memory devices 1410 that enable data storage, such as data storage devices that can be accessed by a computing device, and that provide persistent storage of data and executable instructions (e.g., software applications, programs, functions, and the like). Examples of the computer-readable storage memory devices 1410 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1400 may also include a mass storage media device.

The computer-readable storage memory device 1410 provides data storage mechanisms to store the device data 1412, other types of information or data, and various device applications 1414 (e.g., software applications). For example, an operating system 1416 can be maintained as software instructions with a memory device and executed by the processing system 1406. The device applications 1414 may also include a device manager, such as any form of a control application, software application, signal-processing and control module, code that is native to a particular device, a hardware abstraction layer for a particular device, and so on.

The device 1400 can also include one or more device sensors 1418, such as any one or more of an ambient light sensor, a proximity sensor, a touch sensor, an infrared (IR) sensor, accelerometer, gyroscope, thermal sensor, audio sensor (e.g., microphone), and the like. The device 1400 can also include one or more power sources 1420, such as when the device 1400 is implemented as a mobile device. The power sources 1420 may include a charging or power system, and can be implemented as a flexible strip battery, a rechargeable battery, a charged super-capacitor, or any other type of active or passive power source.

The device 1400 additionally includes an audio or video processing system 1422 that generates one or both of audio data for an audio system 1424 and display data for a display system 1426. In accordance with some embodiments, the audio/video processing system 1422 is configured to receive call audio data from the transceiver 1404 and communicate the call audio data to the audio system 1424 for playback at the device 1400. The audio system or the display system may include any devices that process, display, or otherwise render audio, video, display, or image data. Display data and audio signals can be communicated to an audio component or to a display component, respectively, via an RF (radio frequency) link, S-video link, HDMI (high-definition multimedia interface), composite video link, component video link, DVI (digital video interface), analog audio connection, or other similar communication link. In implementations, the audio system or the display system are integrated components of the example device. Alternatively, the audio system or the display system are external, peripheral components to the example device.

Although embodiments of techniques for automatically detecting an earpiece mode based on whether a duct is sealed or unsealed have been described in language specific to features or methods, the subject of the appended claims is not necessarily limited to the specific features or methods described. Rather, the specific features and methods are disclosed as example implementations of techniques for implementing automatically detecting an earpiece mode based on whether a duct is sealed or unsealed. Further, various different embodiments are described, and it is to be appreciated that each described embodiment can be implemented independently or in connection with one or more other described embodiments. Additional aspects of the techniques, features, and/or methods discussed herein relate to one or more of the following.

In some aspects, the techniques described herein relate to a method including: determining, based at least in part on audio measurements at a microphone of an earpiece, whether a duct in the earpiece is sealed or unsealed, the duct including an opening allowing sound to pass between an opening to an ear canal of a user and an external environment; and selecting, based on whether the duct is sealed or unsealed, an earpiece mode that includes one or both of an active noise cancellation setting for the earpiece and an equalization setting for the earpiece.

In some aspects, the techniques described herein relate to a method, wherein the earpiece includes a front volume and a sealed back volume, and the duct passes through both the front volume and the sealed back volume.

In some aspects, the techniques described herein relate to a method, wherein the selecting the earpiece mode includes selecting, in response to the duct being unsealed, a pass-through mode in which the active noise cancellation setting indicates active noise cancellation is disabled and the equalization setting indicates audio equalization for an open earpiece.

In some aspects, the techniques described herein relate to a method, wherein the selecting the earpiece mode includes selecting, in response to the duct being sealed, a closed mode in which the active noise cancellation setting indicates active noise cancellation is enabled and the equalization setting indicates audio equalization for a closed earpiece.

In some aspects, the techniques described herein relate to a method, the determining including: determining whether audio content being played back by a speaker of the earpiece is leaking by greater than a threshold amount: determining, in response to the audio content leaking by greater than the threshold amount, that the duct is unsealed; and determining, in response to the audio content not leaking by greater than the threshold amount, that the duct is sealed.

In some aspects, the techniques described herein relate to a method, the determining including: determining a difference between a bass response measured by the microphone and an expected bass response: determining, in response to the difference being greater than a threshold amount, that the duct is unsealed; and determining, in response to the difference not being greater than a threshold amount, that the duct is sealed.

In some aspects, the techniques described herein relate to a method, the determining including: determining a difference between audio content measured by a noise estimate microphone and the audio content measured by an active noise cancellation microphone: determining, in response to the difference being greater than a threshold amount, that the duct is sealed; and determining, in response to the difference not being greater than a threshold amount, that the duct is unsealed.

In some aspects, the techniques described herein relate to a method, further including outputting, via the opening to the ear canal of the user, audio based on one or both of the active noise cancellation setting and the equalization setting.

In some aspects, the techniques described herein relate to a device including: a transducer; an active noise cancellation microphone; a sealed back volume situated between the transducer and an external environment; a front volume situated between the transducer and an opening to output audio to an ear canal of a user; a duct including an opening allowing sound to pass, through the sealed back volume and the front volume, between the ear canal of the user and the external environment; a sealed determination module to determine, based at least in part on audio measurements at the active noise cancellation microphone, whether the duct is sealed or unsealed; and a mode selection module to select, based on whether the duct is sealed or unsealed, an operating mode for the device that includes one or both of an active noise cancellation setting for the device and an equalization setting for the device.

In some aspects, the techniques described herein relate to a device, further including a grommet or gasket that can be moved to seal or unseal the duct.

In some aspects, the techniques described herein relate to a device, wherein the grommet or gasket can be moved via a linear actuator.

In some aspects, the techniques described herein relate to a device, wherein the grommet or gasket can be moved via a lead screw.

In some aspects, the techniques described herein relate to a device, wherein the grommet or gasket can be moved to seal the duct by pinching the duct.

In some aspects, the techniques described herein relate to a device, wherein the device includes an earpiece.

In some aspects, the techniques described herein relate to a device, wherein the mode selection module is further to select, in response to the duct being unsealed, a pass-through mode in which the active noise cancellation setting indicates active noise cancellation is disabled and the equalization setting indicates audio equalization for an open earpiece.

In some aspects, the techniques described herein relate to a device, wherein the mode selection module is further to select, in response to the duct being sealed, a closed mode in which the active noise cancellation setting indicates active noise cancellation is enabled and the equalization setting indicates audio equalization for a closed earpiece.

In some aspects, the techniques described herein relate to a device, wherein the sealed determination module is to: determine whether audio content being played back by a speaker of the earpiece is leaking by greater than a threshold amount: determine, in response to the audio content leaking by greater than the threshold amount, that the duct is unsealed; and determine, in response to the audio content not leaking by greater than the threshold amount, that the duct is sealed.

In some aspects, the techniques described herein relate to a device, wherein the sealed determination module is to: determine a difference between a bass response measured by the microphone and an expected bass response: determine, in response to the difference being greater than a threshold amount, that the duct is unsealed; and determine, in response to the difference not being greater than a threshold amount, that the duct is sealed.

In some aspects, the techniques described herein relate to a device, wherein the sealed determination module is to: determine a difference between audio content measured by a noise estimate microphone and the audio content measured by an active noise cancellation microphone: determine, in response to the difference being greater than a threshold amount, that the duct is sealed; and determine, in response to the difference not being greater than a threshold amount, that the duct is unsealed.

In some aspects, the techniques described herein relate to a method including: receiving a user input to seal or unseal a duct in an earpiece, the duct including an opening allowing sound to pass between an opening to an ear canal of a user and an external environment; detecting whether the duct is sealed or unsealed; selecting, based on whether the duct is sealed or unsealed, one or both of an active noise cancellation setting for the earpiece and an equalization setting for the earpiece; and outputting audio based on one or both of the active noise cancellation setting and the equalization setting.

What is claimed is:

1. A method comprising:

determining whether a duct in an earpiece is sealed or unsealed, the duct comprising an opening allowing sound to pass between an opening to an ear canal of a user and an external environment; and selecting, in response to the duct being unsealed, a pass-through mode for the earpiece in which an active noise cancellation setting for the earpiece indicates active noise cancellation is disabled and an equalization setting for the earpiece indicates audio equalization for an open earpiece.

2. The method of claim 1, wherein the earpiece includes a front volume and a sealed back volume, and the duct passes through both the front volume and the sealed back volume.

3. The method of claim 1, further comprising selecting, in response to the duct being sealed, an earpiece mode for the earpiece in which the active noise cancellation setting for the earpiece indicates active noise cancellation is enabled and the equalization setting for the earpiece indicates audio equalization for a closed earpiece.

4. The method of claim 1, the determining comprising:

determining whether audio content being played back by a speaker of the earpiece is leaking by greater than a threshold amount;

determining, in response to the audio content leaking by greater than the threshold amount, that the duct is unsealed; and determining, in response to the audio content not leaking by greater than the threshold amount, that the duct is sealed.

5. The method of claim 1, the determining comprising:

determining a difference between a bass response measured by a microphone of the earpiece and an expected bass response;

determining, in response to the difference being greater than a threshold amount, that the duct is unsealed; and determining, in response to the difference not being greater than a threshold amount, that the duct is sealed.

6. The method of claim 1, the determining comprising:

determining a difference between audio content measured by a noise estimate microphone and the audio content measured by an active noise cancellation microphone;

determining, in response to the difference being greater than a threshold amount, that the duct is sealed; and determining, in response to the difference not being greater than a threshold amount, that the duct is unsealed.

7. The method of claim 1, further comprising outputting, via the opening to the ear canal of the user, audio based on one or both of the active noise cancellation setting and the equalization setting.

8. An earpiece comprising:

a transducer;

an active noise cancellation microphone;

a sealed back volume situated between the transducer and an external environment;

a front volume situated between the transducer and an opening to output audio to an ear canal of a user;

a duct comprising an opening allowing sound to pass, through the sealed back volume and the front volume, between the ear canal of the user and the external environment;

a sealed determination module to determine whether the duct is sealed or unsealed; and a mode selection module to select, in response to the duct being unsealed, a pass-through mode for the earpiece in which an active noise cancellation setting for the earpiece indicates active noise cancellation is disabled and an equalization setting for the earpiece indicates audio equalization for an open earpiece.

9. The earpiece device of claim 8, further comprising a grommet or gasket that can be moved to seal or unseal the duct.

10. The earpiece of claim 9, wherein the grommet or gasket can be moved via a linear actuator.

11. The earpiece of claim 9, wherein the grommet or gasket can be moved via a lead screw.

12. The earpiece of claim 9, wherein the grommet or gasket can be moved to seal the duct by pinching the duct.

13. The earpiece of claim 8, wherein the mode selection module is further to select, in response to the duct being sealed, a closed mode for the earpiece in which the active noise cancellation setting for the earpiece indicates active noise cancellation is enabled and the equalization setting for the earpiece indicates audio equalization for a closed earpiece.

14. The earpiece of claim 8, wherein the sealed determination module is to:

determine whether audio content being played back by a speaker of the earpiece is leaking by greater than a threshold amount;

determine, in response to the audio content leaking by greater than the threshold amount, that the duct is unsealed; and determine, in response to the audio content not leaking by greater than the threshold amount, that the duct is sealed.

15. The earpiece device of claim 8, wherein the sealed determination module is to:

determine a difference between a bass response measured by a microphone and an expected bass response;

determine, in response to the difference being greater than a threshold amount, that the duct is unsealed; and determine, in response to the difference not being greater than a threshold amount, that the duct is sealed.

16. The earpiece of claim 8, wherein the sealed determination module is to:

determine a difference between audio content measured by a noise estimate microphone and the audio content measured by an active noise cancellation microphone;

determine, in response to the difference being greater than a threshold amount, that the duct is sealed; and determine, in response to the difference not being greater than a threshold amount, that the duct is unsealed.

17. A method comprising:

receiving a user input to seal or unseal a duct in an earpiece, the duct comprising an opening allowing sound to pass between an opening to an ear canal of a user and an external environment;

detecting whether the duct is sealed or unsealed;

selecting, in response to the duct being unsealed, a mode for the earpiece in which an active noise cancellation setting for the earpiece indicates active noise cancellation is disabled and an equalization setting for the earpiece indicates audio equalization for an open earpiece; and outputting audio based on the active noise cancellation setting and the equalization setting.

18. The method of claim 17, further comprising selecting, in response to the duct being sealed, an earpiece mode for the earpiece in which the active noise cancellation setting for the earpiece indicates active noise cancellation is enabled and the equalization setting for the earpiece indicates audio equalization for a closed earpiece.

19. The method of claim 17, wherein the user input comprises a voice command.

20. The method of claim 17, wherein the user input comprises a user gesture.

* * * * *